United States Patent Office 2,901,338
Patented Aug. 25, 1959

2,901,338

HALOGENATED ORGANIC COMPOUNDS

Sidney B. Richter, Chicago, Ill., assignor to Velsicol Chemical Corporation, Chicago, Ill., a corporation of Illinois No Drawing. Application March 20, 1957
Serial No. 647,197

8 Claims. (Cl. 71—2.5)

This invention relates to new organic sulfite ethers which are distinguished by remarkably great herbicidal activity. These new compounds contain the

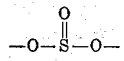

radical which is characteristic of sulfites, and further they contain a wide variety of substituted alkyl groups attached to the two oxygen atoms in the sulfite group. The substituted alkyl groups themselves can each contain from 2 to 4 carbon atoms. One of said alkyl groups is halogenated, while the other is attached via an ether linkage to a 5- or 6-membered cyclic aliphatic radical, which itself can be halogenated or oxygenated.

In particular, this invention relates to organic sulfites having the general formula

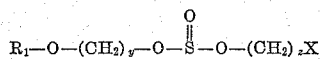

wherein $R_1$ is a cyclic aliphatic radical containing from 5 to 6 carbon atoms, $y$ and $z$ are integers from 2 to 4, and X is selected from the group consisting of chlorine, bromine, and fluorine. It has been found that compounds of this invention in which $R_1$ is a halogenated or oxygenated cyclic aliphatic radical are very useful substances for the regulation of plant growth, and products in which $R_1$ is a cyclopentenyl radical are particularly active.

The organic sulfites of this invention are prepared readily and in excellent yields by the stepwise reaction of thionyl chloride with the appropriate alcohols. The synthesis may be presented schematically by the following reactions, wherein $R_1$, $y$, $z$, and X are as described above:

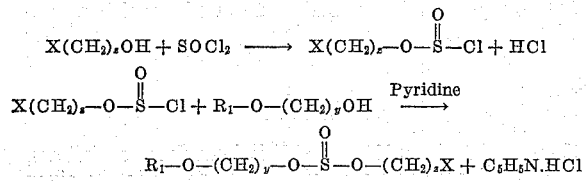

It is preferable to effect the reaction in the presence of pyridine or other acid scavengers. The pyridine when used serves to remove free hydrogen chloride from the reaction mixture as it is formed, but its presence is not essential if the reaction is effected under an atmosphere of a dry and inert gas such as nitrogen or air. Aromatic solvents such as benzene and xylene can be used to facilitate the reaction. Temperatures within a wide range may be used to effect these reactions. A preferred range of reaction temperatures is between 15° and 60°, although temperatures below and above this range can also be used, since the exact temperature is not critical. However, the reactions can be quite slow at temperatures below 15° C. In certain cases, decomposition of some of the reactants may occur at temperatures above 60° C. The compounds of this invention are unexpectedly very active herbicidal substances even though they do not exhibit any significant toxicity toward insects and mites. For example, in tomato watering tests conducted to study root absorption and translocation, 2-chloroethyl-2-(2-cyclopentenyloxy)ethyl sulfite was formulated into a 10% wettable powder and dispersed in water to a concentration of 4,000 p.p.m. of actual compound. Ten milliliters of an aliquot part of this dispersion were applied to the soil surface of young potted tomato plants (Bonny Best variety) approximately 5 to 7 inches tall. In order to avoid undue concentration or accumulation of the chemical in any given area, 5 holes of diameter about one centimeter and about one inch deep were punched in the soil surface around the shoot, and the 10 ml. application was divided equally among the 5 holes. Three plants were used for each application. The treated plants were held under ideal greenhouse conditions for 10 days, provided with subterranean watering, and observed for response to treatment.

After 12 days, it was found that the plants in the pots treated with the suspension of 2-chloroethyl-2-(2-cyclopentenyloxy)ethyl sulfite were completely wilted, and their root structure was disintegrated. On the other hand, growth and root structure in plants not treated with this compound were completely normal. In similar soil watering experiments carried out at a later date, 2-chloroethyl-2-(2-cyclopentenyloxy)ethyl sulfite used at a concentration of 4,000 p.p.m. gave tomato plants which had root structures which were 1/64 of normal after 10 days compared to an untreated control. The suspension of 2-chloroethyl-2-(2-cyclopentenyloxy)ethyl sulfite was also caustic to the stems of the tomato plants at the soil line.

Experiments were also carried out in which suspensions of these active compounds were applied directly to the foliage of Bonny Best variety tomato plants. Thus, 2-(2-cyclopentenyloxy)ethyl sulfite was formulated into a 10% wettable powder, dispersed in water to a concentration of 4,000 p.p.m. and applied to the foliage of four-week-old potted tomato plants by dipping the plants therein. Three replicates were used for each treatment. The treated plants were held under greenhouse conditions for 12 days, provided with subterranean watering, and observed for response to treatment. After 12 days, all the plants treated with the suspension of 2-chloroethyl-2-(2-cyclopentenyloxy)ethyl sulfite were wilted, and their root structures were disintegrated. The growth and root structure of untreated control plants were completely normal.

For practical use, the compounds of this invention are formulated and applied in the manner well known in the art of controlling noxious plant growth. For example, these compounds can be formulated into dusts by combining them with such inert substances as talc or clays, and in this form they are applied directly to the plants which it is desired to destroy. The compounds can also be dissolved in organic solvents such as kerosene or the methylated naphthalenes; or they can be emulsified or suspended in water by the addition of emulsifiers or wetting agents. The liquid formulations of these active herbicidal compounds are either applied directly to the plants to be controlled by spraying, or the soil in which the plants are growing can be treated directly. Other substances such as activators, synergists, spreaders, and adhesives can be added to the formulations if required.

The following examples illustrate the manner in which the herbicidally useful compounds of this invention may be prepared.

*Example I*

2-(2-cyclopentenyloxy)ethanol, which is the ether-alcohol required as an intermediate in the preparation of 2- chloroethyl-2-(2-cyclopentenyloxy)ethyl sulfite, was prepared as follows: 3-chlorocyclopentene (107 g., 1.04 mol.) was added dropwise with stirring over a period of 1 hour to 200 ml. of ethylene glycol in the presence of methyl red indicator. Ammonia (18 g., 1.06 mol.) in 150 ml. ethylene glycol was added simultaneously with the 3-chlorocyclopentene at such a rate that the reaction mixture became basic to the methyl red only momentarily every 2 to 3 minutes. The temperature of the reaction mixture was maintained at 25 to 30°. When the addition was complete, the reaction mixture was allowed to stand overnight and was then extracted repeatedly with ethyl acetate. The solvent was distilled off, and the residue was dissolved in ethyl ether, washed with water, dried over sodium sulfate, and freed of ether by distillation. The water washings were extracted with ether, and the ether solution was washed with 10% sodium chloride solution, dried over sodium sulfate, filtered, and freed of ether. The combined residues from the ether evaporations were distilled in vacuo to give 77 g. (60% of theory) of 2-(2-cyclopentenyloxy)-ethanol, boiling at 85 to 91° under 10 mm. pressure and having an index of refraction (D line) of 1.4730 at 20° C.

*Example II*

In order to prepare the intermediate 2-chloroethyl chlorosulfinate, thionyl chloride (70 g.) was added over a period of about 6 hours to 40 g. of ethylene chlorohydrin in a 250 ml. round-bottomed flask protected with a calcium chloride drying tube. The addition was made at such a rate that the temperature did not rise above 35° during the addition process. The product was distilled to give 76 g. of 2-chloroethyl chlorosulfinate boiling at 84 to 86° under 25 mm. pressure.

This intermediate sulfinate was then condensed with 2-(2-cyclopentenyloxy)ethanol, prepared as described in Example I, to give the desired 2-chloroethyl-2-(2-cyclopentenyloxy)ethyl sulfite. Thus 2-(2-cyclopentenyloxy)-ethanol (32 g., 0.25 mol.), 300 ml. benzene, and 20 g. pyridine (0.25 mol.) were placed in a 500 ml. round-bottomed flask fitted with a stirrer, thermometer, reflux condenser, and dropping funnel. The 2-chloroethyl chlorosulfinate (41 g., 0.25 mol.) prepared as described above was added to the stirred mixture in the flask over a period of 75 minutes at a rate such that the temperature did not exceed 35°. After the addition, stirring was continued for an additional hour. The solution was then filtered, washed with water, and dried over sodium sulfate. The solvent was removed at reduced pressure, and the resulting residue was fractionated through a 10-inch Vigreux column to give 44 g. (70% of theory) of 2-chloroethyl-2-(2-cyclopentenyloxy)ethyl sulfite, boiling at 106 to 112° under 0.1 mm. pressure and having an index of refraction (D line) of 1.4870 at 24°.

*Analysis.*—$C_9H_{15}ClO_4S$: Found: C, 42.05%; H, 5.48%; Cl, 14.15%. Calculated: C, 42.46%; H, 5.89%; Cl, 13.93%.

*Example III*

In order to prepare the intermediate 2-(2,3-epoxycyclopentanoxy)ethanol, ethylene glycol (200 cc.) is treated with 1-chloro-2,3-epoxycyclopentane (127 g., 1.04 mol.) and ammonia (18 g., 1.06 mol.) in 200 cc. ethylene glycol over a period of 1 hour at 25–30° in the manner which has been described in Example I. Extraction and distillation of the reaction mixture give 2-(2,3-epoxycyclopentanoxy)ethanol.

*Example IV*

2-chloroethyl-2-(2,3-epoxycyclopentanoxy)ethyl sulfite is prepared as follows: 2-chloroethyl chlorosulfinate (41 g., 0.25 mol.), prepared as described in Example II, is added with stirring over a period of 1 hour to a mixture of 2-(2,3-epoxycyclopentanoxy)ethanol (36 g., 0.25 mol.), 300 ml. benzene, and 20 g. pyridine (0.25 mol.). The temperature is kept below 35° during the addition, after which the reaction mixture is stirred for an additional hour. The product is worked up and distilled in the manner described in Example II to give the desired 2-chloroethyl-2-(2,3-epoxycyclopentanoxy)ethyl sulfite.

*Example V*

The intermediate ether-alcohol 3-(2-chlorocyclopentanoxy) propanol is prepared by a technique similar to that described in Example I. Thus, 1,2-dichlorocyclopentane (139 g., 1.0 mol.) is added dropwise with stirring at 25–30° over a period of 1.5 hours to 20 cc. of 1,3-propanediol while ammonia (17 g., 1.0 mol.) in 20 cc. 1,3-propanediol is added just rapidly enough to make the reaction mixture basic to methyl red only momentarily every 2 to 3 minutes. The reaction mixture is then allowed to stand overnight, extracted with ethyl acetate, reduced, taken up in ether, washed with water, dried, and distilled in vacuo to give 3-(2-chlorocyclopentanoxy)-propanol.

*Example VI*

In order to prepare the intermediate 2-bromoethyl chlorosulfinate, ethylene bromohydrin (62 g.) is treated with thionyl chloride (70 g.) in a manner similar to that described in Example II. Distillation gives the desired 2-bromoethyl chlorosulfinate.

2-bromoethyl-3-(2-chlorocyclopentanoxy)propyl sulfite is then prepared as follows: The 2-bromoethyl chlorosulfinate (52 g., 0.25 mol.) obtained above is added dropwise over a period of one hour to a stirred mixture of 2-(2-chlorocyclopentanoxy)propanol (44 g., 0.25 mol.), prepared as described in Example V, and 20 g. pyridine (0.25 mol.) in 400 cc. xylene. The temperature is maintained at 30° or below during the addition, after which the reaction mixture is allowed to stand for several hours. The reaction product is filtered, washed with water, dried over sodium sulfate, and distilled in vacuo. After the removal of the solvent and a small forerun, the fraction consisting of 2-bromoethyl-3-(2-chlorocyclopentanoxy)propyl sulfite is collected.

*Example VII*

The following spray formulation of the product from Example II is prepared by mixing the ingredients intimately in the given percentage proportions by weight:

| | Percent |
|---|---|
| 2-chloroethyl-2-(2-cyclopentenyloxy)ethyl sulfite | 33 |
| Antarox A–400 | 44 |
| Methanol | 23 |

"Antarox A–400" is the trade name under which a nonionic detergent of the aromatic polyethylene glycol ether type is sold. The above concentrate is diluted with water for use.

*Example VIII*

The product from Example IV is formulated as follows, where the ingredients are mixed thoroughly in the given percentage proportions by weight:

| | Percent |
|---|---|
| 2-chloroethyl-2-(2,3-epoxycyclopentanoxy)ethyl sulfite | 59 |
| Triton X–100 | 5 |
| Xylene | 10 |
| Kerosene | 26 |

"Triton X–100" is the trade name under which an emulsifier of the alkyl aryl polyether alcohol type is sold. The above concentrate is diluted as is desired for use.

*Example IX*

A formulation as follows is prepared from the product of Example VI. The ingredients are combined in the given percentage proportions by weight.

|   | Percent |
|---|---|
| 2-bromoethyl-3-(2-chlorocyclopentanoxy)propyl sulfite | 44 |
| Antarox A-400 | 5 |
| Velsicol AR-50 | 51 |

"Antarox A-400" is the trade name under which a nonionic detergent of the aromatic polyethylene glycol ether type is sold. "Velsicol AR-50" is a methylated naphthalene solvent. The concentrate is diluted for use.

It is obvious that a wide variety of other chemical compounds can be substituted for the specific compounds used as starting materials in the above examples to give other herbicidal compositions which fall within the scope of this invention. Thus products in which $R_1$ is a six-membered ring can be obtained by using such compounds as 3-chlorocyclohexene or monochlorocyclohexane instead of the 3-chlorocyclopentene in Example I, whereupon the final herbicidal products from Example II will be 2-chloroethyl-2-(2-cyclohexenyloxy)ethyl sulfite and 2-chloroethyl-2-(cyclohexyloxy)ethyl sulfite, respectively. Products with halogenated or oxygenated six-membered rings can be prepared by using, for example, 1,2-dichlorocyclohexane or 1-chloro-2,3-epoxycyclohexane. The final herbicidal products will then be 2-chloroethyl-2-(2-chlorocyclohexyloxy)ethyl sulfite and 2-chloroethyl-2-(2,3-epoxycyclohexyloxy)ethyl sulfite, respectively. The group $(CH_2)_y$ can be made to contain 4 carbon atoms, for example, by using 1,4-butanediol in place of ethylene glycol in Example I, whereupon the final herbicidal product from Example II will be 2-chloroethyl-2-(2-cyclopentenyloxy)butyl sulfite. Similarly, $(CH_2)_z$ can be made to contain 3 or 4 carbon atoms by using 3-chloro-1-propanol or 4-chloro-1-butanol, respectively, in place of the ethylene chlorohydrin in Example II, with the result that the final products will be 3-chloropropyl-2-(2-cyclopentenyloxy)ethyl sulfite and 4-chlorobutyl-2-(2-cyclopentenyloxy)ethyl sulfite, respectively. Further, X can readily be fluorine instead of chlorine or bromine, since compounds such as 2-fluoroethanol can be used in place of ethylene chlorohydrin as described in Example I, whereupon the final herbicidal product from Example II will be 2-fluoroethyl-2-(2-cyclopentenyloxy)ethyl sulfite.

I claim:

1. A composition of matter having the structure

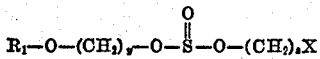

wherein $R_1$ is a chlorinated alicyclic saturated hydrocarbon radical containing from 5 to 6 carbon atoms in the ring and wherein said chlorine is attached directly to said ring, y and z are integers from 2 to 4, and X is selected from the group consisting of chlorine, bromine, and fluorine.

2. A composition of matter having the structure

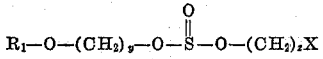

wherein $R_1$ is an alicyclic saturated hydrocarbon radical having an epoxy group in the 2,3-position and containing from 5 to 6 carbon atoms in the ring, y and z are integers from 2 to 4, and X is selected from the group consisting of chlorine, bromine, and fluorine.

3. 2-chloroethyl-2-(2-cyclopentenyloxy)ethyl sulfite.

4. 2-chloroethyl-2-(2,3-epoxycyclopentanoxy)ethyl sulfite.

5. 2-bromoethyl-3-(2-chlorocyclopentanoxy)propyl sulfite.

6. A herbicidal composition comprising an inert carrier and a herbicidal toxic amount of the composition of matter described in claim 8.

7. A method of destroying undesirable plants which comprises contacting said plants with a herbicidal composition comprising an inert carrier and as the essential active ingredient, in a quantity which is injurious to said plants, a composition of matter as described in claim 8.

8. A composition of matter having the structure

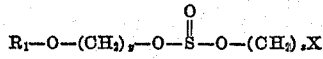

wherein $R_1$ is selected from the group consisting of alicyclic hydrocarbon radicals having from 5 to 6 carbon atoms in the ring, alicyclic saturated hydrocarbon radicals having an epoxy group in the 2,3-position and from 5 to 6 carbon atoms in the ring, and chlorinated alicyclic saturated hydrocarbon radicals having from 5 to 6 carbon atoms in the ring and wherein said chlorine is attached directly to said ring, y and z are integers from 2 to 4, and X is selected from the group consisting of chlorine, bromine, and fluorine.

References Cited in the file of this patent

UNITED STATES PATENTS

| 2,529,493 | Harris et al. | Nov. 14, 1950 |
| 2,529,494 | Harris et al. | Nov. 14, 1950 |
| 2,644,008 | Glenn et al. | June 30, 1953 |
| 2,802,727 | Harris et al. | Aug. 13, 1957 |